(12) United States Patent
Ashida et al.

(10) Patent No.: US 9,018,866 B2
(45) Date of Patent: Apr. 28, 2015

(54) ELECTRICAL STORAGE SYSTEM AND PROCESSING METHOD

(71) Applicants: Shinjiro Ashida, Toyota (JP); Tatsuki Nishimata, Kariya (JP)

(72) Inventors: Shinjiro Ashida, Toyota (JP); Tatsuki Nishimata, Kariya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 128 days.

(21) Appl. No.: 13/928,681

(22) Filed: Jun. 27, 2013

(65) Prior Publication Data

US 2014/0009090 A1   Jan. 9, 2014

(30) Foreign Application Priority Data

Jul. 9, 2012  (JP) .................. 2012-154128

(51) Int. Cl.
*H02P 31/00* (2006.01)
*H01M 10/42* (2006.01)
*H02J 7/00* (2006.01)

(52) U.S. Cl.
CPC ........... *H02P 31/00* (2013.01); *H01M 10/4207* (2013.01); *H02J 7/0021* (2013.01); *H02P 2201/07* (2013.01)

(58) Field of Classification Search
CPC .................................................... H02P 31/00
USPC ........................................... 318/139, 34, 558
See application file for complete search history.

(56) References Cited

U.S. PATENT DOCUMENTS

| | | | |
|---|---|---|---|
| 5,534,764 A * | 7/1996 | Masaki et al. | 318/802 |
| 2012/0242344 A1 | 9/2012 | Ishishita | |

FOREIGN PATENT DOCUMENTS

| | | |
|---|---|---|
| JP | A-2000-275279 | 10/2000 |
| JP | A-2002-286820 | 10/2002 |
| JP | A-2010-51072 | 3/2010 |
| JP | A-2010-132141 | 6/2010 |
| JP | A-2010-158097 | 7/2010 |
| JP | A-2011-117796 | 6/2011 |
| JP | A-2012-85455 | 4/2012 |

* cited by examiner

*Primary Examiner* — David S Luo
(74) *Attorney, Agent, or Firm* — Oliff PLC

(57) ABSTRACT

At least one of a current value and a voltage value of an electrical storage device which is charged and discharged is detected with the use of each of a plurality of sensors. A predetermined process is executed on the basis of the detected values of the plurality of sensors The predetermined process is executed without using the detected values of the sensors in the predetermined process when a difference between a frequency of each of the detected values, which varies with a rotation speed of a motor that operates upon reception of an output power of the electrical storage device, and a resonance frequency of a step-up circuit, which varies with operation of the step-up circuit that steps up an output voltage of the electrical storage device and outputs the stepped-up electric power to the motor, is smaller than a threshold.

6 Claims, 5 Drawing Sheets

ELECTRICAL STORAGE SYSTEM AND PROCESSING METHOD

INCORPORATION BY REFERENCE

The disclosure of Japanese Patent Application No. 2012-154128 filed on Jul. 9, 2012 including the specification, drawings and abstract is incorporated herein by reference in its entirety.

BACKGROUND OF THE INVENTION

1. Field of the Invention

The invention relates to a technique for, when a current value or voltage value of an electrical storage device is detected, utilizing the detected current value or the detected voltage value in consideration of a detection error due to ripple current.

2. Description of Related Art

Japanese Patent Application Publication No. 2011-117796 (JP 2011-117796 A) describes that the detection timing of a voltage value and the detection timing of a current value need to be synchronized with each other in order to accurately evaluate the internal resistance of a battery. Here, when there is ripple current, the correspondence relationship between a current value and a voltage value deviates due to a deviation between the detection timing of a voltage value and the detection timing of a current value.

Therefore, when there is ripple current, it is possible to prevent erroneous determination that there is an abnormality in the internal resistance if the internal resistance is not calculated on the basis of the detected voltage value and the detected current value. That is, when there is ripple current, it is possible not to use the detected voltage value and the detected current value at the time of calculating the internal resistance.

Here, as is described in JP 2011-117796 A, the peak-to-peak value of ripple current varies on the basis of the rotation speed of a motor, so it is possible to acquire an increase in ripple current by monitoring the rotation speed of the motor.

In a system that includes a motor and a step-up circuit, ripple current increases through not only the rotation speed (number of revolutions) of the motor but also the switching operation of the step-up circuit. Here, for example, if the internal resistance is calculated or not calculated on the basis of only the rotation speed of the motor, an opportunity to calculate the internal resistance may be limited more than necessary.

SUMMARY OF THE INVENTION

A first aspect of the invention provides an electrical storage system. The electrical storage system includes an electrical storage device configured to be charged and discharged; a step-up circuit configured to step up an output voltage of the electrical storage device; an inverter configured to convert a direct-current power, output from the step-up circuit, to an alternating-current power; a motor configured to operate upon reception of an output power of the inverter; a plurality of sensors each configured to detect at least one of a current value and a voltage value of the electrical storage device; and a controller configured to execute a predetermined process on the basis of the detected values of the plurality of sensors. The controller is configured to execute the predetermined process without using the detected values of the sensors when a difference between a frequency of each of the detected values and a resonance frequency of the step-up circuit is smaller than a threshold. The frequency varies with a rotation speed of the motor. The resonance frequency varies with operation of the step-up circuit.

When the frequency that varies with the rotation speed of the motor is substantially equal to the frequency that varies with the operation of the step-up circuit (so-called LC resonance frequency), ripple current easily increases. If ripple current increases, variations easily occur in the detected values of the sensors due to, for example, variations in detection timing among the plurality of sensors as described above. In this case, it is difficult to ensure the reliability of the detected values of the sensors, so it is not desirable to execute the predetermined process on the basis of the detected values of the sensors.

With the first aspect of the invention, when the difference between the frequency that varies with the rotation speed of the motor and the frequency that varies with the operation of the step-up circuit is smaller than the threshold, it is possible to prevent execution of the predetermined process on the basis of the detected values, on the basis of which it is difficult to ensure reliability, by not using the detected values of the sensors in the predetermined process. That is, when the predetermined process is executed, it is possible to prevent execution of an erroneous process.

It is conceivable not to use the detected values of the sensors in the predetermined process on the basis of only the rotation speed of the motor; however, in this case, the detected values of the sensors are not used more than necessary. When only the rotation speed or the motor is taken into consideration, it is required to preset a rotation speed range in which ripple current increases. Here, depending on the set rotation speed range, the detected values may not be used because the rotation speed falls within the set range although the detected values of the sensors are allowed to be used.

With the first aspect of the invention, the detected values of the sensors are not used in consideration of not only the rotation speed of the motor but also the operation of the step-up circuit, so it is possible to suppress a situation that the detected values of the sensors are not used more than necessary. That is, it is possible to appropriately acquire an increase in ripple current on the basis of the rotation speed of the motor and the operation of the step-up circuit, and it is possible to appropriately determine whether to use the detected values of the sensors.

Here, when it is determined whether the difference between the two frequencies is smaller than the threshold, a relationship between the rotation speed of the motor and a duty ratio at the time of the operation of the step-up circuit may be taken into consideration.

The plurality of sensors may include a sensor configured to detect the current value of the electrical storage device and a sensor configured to detect the voltage value of the electrical storage device. In this case, as the predetermined process, a resistance value of the electrical storage device may be calculated on the basis of the current value detected by the plurality of sensors and the voltage value detected by the plurality of sensors. Here, when the difference in frequency is smaller than the threshold, the current value detected by the plurality of sensors and the voltage value detected by the plurality of sensors may not be used at the time of calculating the resistance value.

Thus, it is possible to suppress a situation that the resistance value of the electrical storage device is calculated on the basis of the current value and the voltage value, on the basis of which it is difficult to ensure reliability due to ripple current. The resistance value of the electrical storage device is used to acquire a degraded state of the electrical storage device, and charging and discharging operations of the electrical storage device are limited when the resistance value increases. When it is difficult to ensure the reliability of the resistance value to be calculated, charging and discharging operations of the electrical storage device are erroneously limited; however, according to the first aspect of the invention, it is possible to suppress a situation that charging and discharging operations are erroneously limited.

The plurality of sensors may include a first current sensor and a second current sensor each configured to detect the current value of the electrical storage device. In this case, as the predetermined process, when the detected value of the first current sensor and the detected value of the second current sensor deviate from each other, it may be determined that one of the first current sensor and the second current sensor is in a failed state.

Here, when the difference in frequency is smaller than the threshold, the detected value of the first current sensor and the detected value of the second current sensor may not be used at the time of making determination as to the failed state. Thus, it is possible to suppress a situation that it is determined whether the two current sensors are in a failed state on the basis of the two current values, on the basis of which it is difficult to ensure reliability due to ripple current.

The plurality of sensors may include a first voltage sensor and a second voltage sensor each configured to detect the voltage value of the electrical storage device. In this case, as the predetermined process, when the detected value of the first voltage sensor and the detected value of the second voltage sensor deviate from each other, it may be determined that one of the first voltage sensor and the second voltage sensor is in a failed state.

Here, when the difference in frequency is smaller than the threshold, the detected value of the first voltage sensor and the detected value of the second voltage sensor may not be used at the time of making determination as to the failed state. Thus, it is possible to suppress a situation that it is determined whether the two voltage sensors are in a failed state on the basis of the two voltage values, on the basis of which it is difficult to ensure reliability due to ripple current.

A second aspect of the invention provides a processing method. The processing method includes: detecting at least one of a current value and a voltage value of an electrical storage device which is charged and discharged, with the use of each of a plurality of sensors; and executing a predetermined process on the basis of the detected values of the plurality of sensors. The predetermined process is executed without using the detected values of the sensors in the predetermined process when a difference between a frequency of each of the detected values and a resonance frequency of a step-up circuit is smaller than a threshold. The frequency varies with a rotation speed of a motor that operates upon reception of an output power of the electrical storage device. The resonance frequency varies with operation of the step-up circuit that steps up an output voltage of the electrical storage device and outputs the stepped-up electric power to the motor. With the second aspect of the invention as well, advantageous effects similar to those of the first aspect of the invention are obtained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described.

Figure 1:
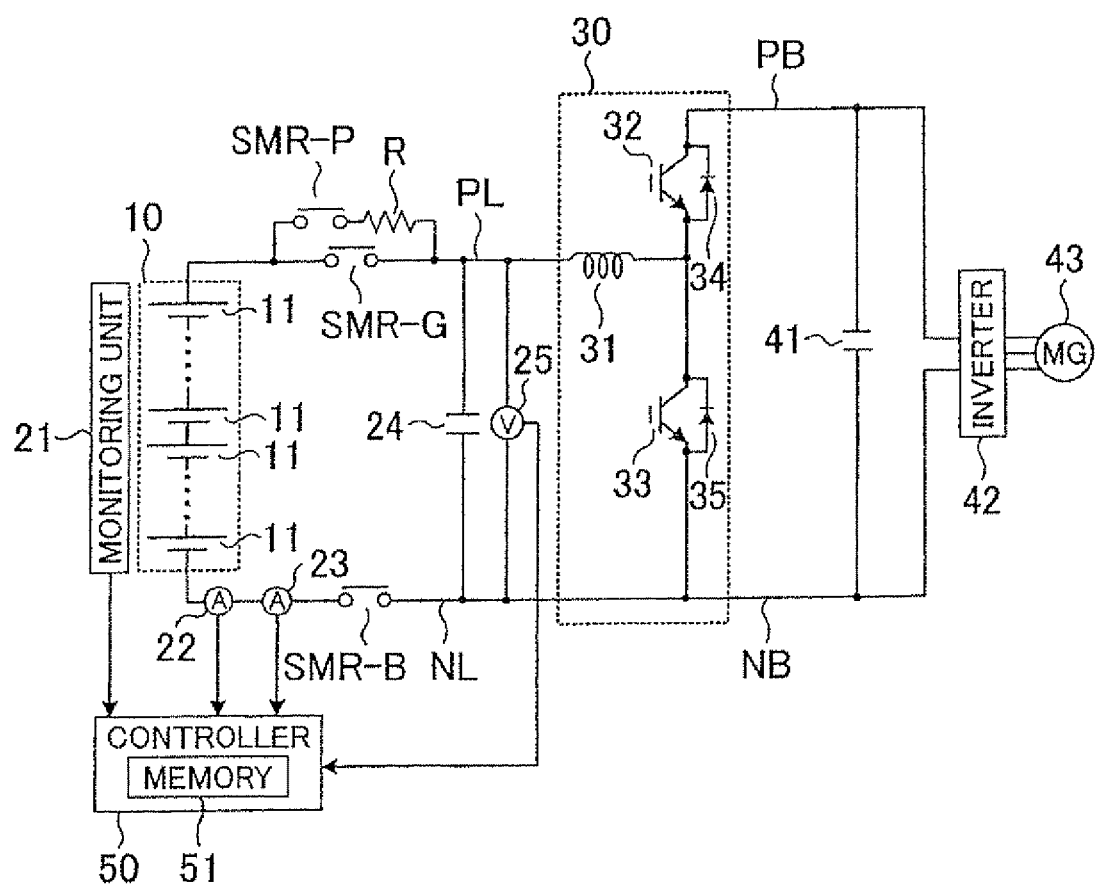
FIG. 1 is a view that shows the configuration of a battery system.

A battery system (which is an example of an electrical storage system) according to a first embodiment of the invention will be described. FIG. 1 is a view that shows the configuration of the battery system according to the present embodiment. The battery system according to the present embodiment may be mounted on a vehicle. The vehicle is an electric vehicle or a hybrid vehicle. The electric vehicle includes only a battery pack (described later) as a power source for propelling the vehicle. The hybrid vehicle includes an engine or fuel cell in addition to the battery pack (described later) as a power source for propelling the vehicle.

A battery pack (which is an example of an electrical storage device) 10 includes a plurality of cells 11 connected in series with each other. The number of the cells 11 that constitute the battery pack 10 may be set as needed in consideration of a required output, or the like, of the battery pack 10. In the present embodiment, the battery pack 10 is formed by connecting all the cells 11 in series with each other; however, the configuration of the battery pack 10 is not limited to this configuration. Specifically, the battery pack 10 may include a plurality of the cells 11 connected in parallel with each other.

Each cell 11 may be a secondary battery, such as a nickel metal hydride battery and a lithium ion battery. Instead of the secondary battery, an electric double layer capacitor may also be used.

A monitoring unit 21 detects a terminal voltage of the battery pack 10, and outputs the detected value to a controller 50. Here, the monitoring unit 21 includes a plurality of monitoring integrated circuits (ICs), and the number of the monitoring ICs provided is equal to the number of the cells 11 that constitute the battery pack 10. Each monitoring IC is connected in parallel with a corresponding one of the cells 11, detects the voltage of the corresponding one of the cells 11, and outputs the detected value to the controller 50.

In the present embodiment, the voltage of each cell 11 is detected by the corresponding monitoring IC; however, it is not limited to this configuration. For example, when the plurality of cells 11 that constitute the battery pack 10 are grouped into a plurality of battery blocks, each monitoring IC may detect the voltage of a corresponding one of the battery blocks. Here, each battery block is formed of a plurality of the cells 11 connected in series with each other, and the battery pack 10 is formed by connecting a plurality of the battery blocks in series with each other.

Two current sensors 22, 23 are provided in a negative electrode line NL connected to the negative electrode terminal of the battery pack 10. Each of the current sensors 22, 23 detects a current value at the time when the battery pack 10 is charged or discharged, and outputs the detected value to the controller 50. By providing the two current sensors 22, 23, even when the current sensor 22 (or the current sensor 23) fails, it is possible to use the other current sensor 23 (or the other current sensor 22). In addition, as will be described later, by comparing the detected values of the two current sensors 22, 23 with each other, it is possible to check for a failure in one of the current sensors 22, 23.

In the present embodiment, the two current sensors 22, 23 are provided in the negative electrode line NL; however, it is not limited to this configuration. That is, it is just required to be able to detect a current value at the time when the battery pack 10 is charged or discharged, and, as long as this condition is satisfied, it is possible to set the locations of the current sensors 22, 23 as needed. For example, the two current sensors 22, 23 may be provided in a positive electrode line PL connected to the positive electrode terminal of the battery pack 10. Alternatively, it is also applicable that the current sensor 22 is provided in the positive electrode line PL and the current sensor 23 is provided in the negative electrode line NL.

In the present embodiment, the two current sensors 22, 23 are used; instead, the number of the current sensors 22, 23 may be appropriately set. That is, the number of the current sensors may be three or more.

The controller 50 includes a memory 51. The memory 51 stores information that is used when the controller 50 executes a prescribed process (particularly, a process described in the present embodiment). In the present embodiment, the memory 51 is incorporated in the controller 50; instead, the memory 51 may be provided outside the controller 50.

The battery pack 10 is connected to a step-up circuit 30 via the positive electrode line PL and the negative electrode line NL. A capacitor 24 is connected to the positive electrode line PL and the negative electrode line NL, and is used to smooth voltage fluctuations between the positive electrode line PL and the negative electrode line NL. A voltage sensor 25 detects the voltage value of the capacitor 24, and outputs the detected value to the controller 50.

Here, the capacitor 24 is charged upon reception of discharge current from the battery pack 10. When the charging operation of the capacitor 24 is complete, the voltage of the capacitor 24 is equal to the voltage of the battery pack 10. Therefore, the voltage sensor 25 detects the voltage of the capacitor 24, and also detects the voltage of the battery pack 10.

A system main relay SMR-G is provided in the positive electrode line PL, and a system main relay SMR-B is provided in the negative electrode line NL. A system main relay SMR-F and a current-limiting resistor R are connected in series with each other, and is connected in parallel with the system main relay SMR-G. The current-limiting resistor R is used to suppress flow of inrush current to the capacitor 24 when the capacitor 24 is precharged through discharging operation of the battery pack 10.

Each of the system main relays SMR-G, SMR-P, SMR-B is switched between on/off states upon reception of a control signal from the controller 50. When the battery pack 10 is connected to the step-up circuit 30, the controller 50 initially switches the system main relays SMR-P, SMR-B from the off state to the on state. Thus, the discharge current of the battery pack 10 flows to the capacitor 24 via the current-limiting resistor R, and it is possible to precharge the capacitor 24.

Subsequently, the controller 50 switches the system main relay SMR-G from the off state to the on state, and switches the system main relay SMR-P from the on state to the off state. Thus, connection of the battery pack 10 with the step-up circuit 30 is completed, and the battery system shown in FIG. 1 enters a started-up state (Ready-ON). Information about an on/off state of an ignition switch of the vehicle is input to the controller 50. The controller 50 causes the battery system to enter the started-up state (Ready-ON) in response to turning on of the ignition switch.

When connection of the battery pack 10 with the step-up circuit 30 is interrupted, the controller 50 switches the system main relays SMR-G, SMR-B from the on state to the off state. Thus, the battery system enters a stopped state (Ready-OFF). When the ignition switch switches from the on state to the off state, the controller 50 causes the battery system to enter the stopped state.

The step-up circuit 30 steps up the voltage between the positive electrode line PL and the negative electrode line NL, and outputs the stepped-up voltage to between bus lines PB, NB. That is the step-up circuit 30 steps up the output voltage of the battery pack 10, and outputs the stepped-up electric power to an inverter 42. The bus line PB is connected to the positive electrode line PL, and the bus line NB is connected to the negative electrode line NL. The step-up circuit 30 includes a reactor 31. One end of the reactor 31 is connected to the positive electrode line PL, and the other end of the reactor 31 is connected to the emitter of a transistor 32 and the collector of a transistor 33.

The transistors 32, 33 are connected in series between the bus lines PB, NB. Here, the collector of the transistor 32 is connected to the bus line PB, and the emitter of the transistor 33 is connected to the bus line NB. The emitter of the transistor 32 is connected to the collector of the transistor 33. Each of the transistors 32, 33 may be, for example, an insulated gate bipolar transistor (IGBT), an npn-type transistor or a power metal oxide semiconductor field-effect transistor (MOSFET).

Diodes 34, 35 are respectively connected in parallel with the transistors 32, 33. Specifically, the anodes of the diodes 34, 35 are respectively connected to the emitters of the transistors 32, 33, and the cathodes of the diodes 34, 35 are respectively connected to the collectors of the transistors 32, 33. A capacitor 41 is connected between the bus lines PB, NB, and is used to smooth voltage fluctuations between the bus lines PB, NB.

The step-up circuit 30 is able to perform step-up operation or step-down operation. When the step-up circuit 30 performs step-up operation, the controller 50 turns on the transistor 33, and turns off the transistor 32. Thus, current flows from the battery pack 10 to the reactor 31, and magnetic field energy based on the amount of current is stored in the reactor 31. Subsequently, the controller 50 causes current to flow from the reactor 31 to the inverter 42 via the diode 34 by switching the transistor 33 from the on state to the of state. Thus, energy stored in the reactor 31 is emitted from the step-up circuit 30, and step-up operation is performed.

The step-down operation of the step-up circuit 30 is performed when the output power of the inverter 42 is supplied to the battery pack 10. When the step-up circuit 30 performs step-down operation, the controller 50 turns on the transistor 32, and turns off the transistor 33. Thus, current from the inverter 42 is supplied to the battery pack 10, and the battery pack 10 is charged. Here, current from the inverter 42 flows through the reactor 31, and step-down operation is performed.

The inverter 42 converts direct-current power, output from the step-up circuit 30, to alternating-current power, and outputs the alternating-current power to a motor generator (MG) 43. In addition, the inverter 42 converts alternating-current power, generated by the motor generator 43, to direct-current power, and outputs the direct-current power to the step-up circuit 30. The inverter 42 operates upon reception of a control signal from the controller 50. The motor generator 43 may be a three-phase alternating-current motor.

The motor generator 43 converts electric energy (alternating-current power), supplied from the inverter 42, to kinetic energy. The motor generator 43 is connected to a wheel, and kinetic energy (rotation force) generated by the motor generator 43 is transmitted to the wheel. Thus, it is possible to propel the vehicle. When the vehicle is decelerated or caused to stop, the motor generator 43 generates electric power by receiving rotation force from the wheel. Alternating-current power generated by the motor generator 43 is output to the inverter 42.

The controller 50 is able to control charging and discharging operations of the battery pack 10 on the basis of the voltage values respectively detected by the monitoring unit 21 and the voltage sensor 25 and the current values respectively detected by the current sensors 22, 23. The controller 50 may be integrated with the monitoring unit 21 or may be integrated with sensors, such as the current sensors 22, 23.

Specifically, the controller 50 is able to identify an overcharged state or overdischarged state of the battery pack 10 by monitoring the voltage values respectively detected by the monitoring unit 21 and the voltage sensor 25. That is, when the detected voltage values are higher than an upper limit voltage value, the controller 50 is allowed to determine that the battery pack 10 is in the overcharged state. When the detected voltage values are lower than a lower limit voltage value, the controller 50 is allowed to determine that the battery pack 10 is in the overdischarged state.

The upper limit voltage value and the lower limit voltage value may be set in advance in consideration of, for example, input/output characteristics of the battery pack 10 (cells 11). Information about the upper limit voltage value and the lower limit voltage value may be stored in the memory 51. When the battery pack 10 is in the overcharged state, it is possible to limit charging operation of the battery pack 10 by decreasing an upper limit electric power at or below which charging operation of the battery pack 10 is allowed. In addition, when the battery pack 10 is in the overdischarged state, it is possible to limit discharging operation of the battery pack 10 by decreasing an upper limit electric power at or below which discharging operation of the battery pack 10 is allowed.

Here, decreasing the upper limit electric power includes setting the upper limit electric power to 0 [kW]. When the upper limit electric power corresponding to charging operation is set to 0 [kW], the battery pack 10 is not charged. In addition, the upper limit electric power corresponding to discharging operation is set to 0 [kW], the battery pack 10 is not discharged.

On the other hand, the controller 50 is able to determine whether an excessive current is flowing through the battery pack 10 by monitoring the current values respectively detected by the current sensors 22, 23. When the detected current values are larger than a threshold, the controller 50 is able to determine that an excessive current is flowing through the battery pack 10. The threshold may be appropriately set in consideration of the input/output characteristics of the battery pack 10. Information about the threshold may be stored in the memory 51.

Here, when an excessive current is flowing through the battery pack 10, it is possible to limit charging and discharging operations of the battery pack 10 as described above. That is, when an excessive charge current flows through the battery pack 10, it is possible to limit charging operation of the battery pack 10; whereas, when an excessive discharge current flows through the battery pack 10, it is possible to limit discharging operation of the battery pack 10. If a circuit breaker, such as a fuse, is provided in a current path of the battery pack 10, it is possible to prevent flow of an excessive current to the battery pack 10 by activating the current breaker.

The controller 50 is able to calculate (estimate) the resistance value of the battery pack 10 (cells 11) by using the voltage values respectively detected by the monitoring unit 21 and the voltage sensor 25 and the current values respectively detected by the current sensors 22, 23. As degradation of the battery pack 10 (cells 11) advances, the resistance value of the battery pack 10 (cells 10 increases. Therefore, by estimating the resistance value of the battery pack 10 (cells 11), it is possible to identify the degraded state of the battery pack 10 (cells 11).

Here, it is possible to calculate the resistance value of the battery pack 10 by, for example, a method described below. Initially, in a coordinate system having a current value and a voltage value as coordinate axes, correlations between the detected current value and the detected voltage value are plotted. When a straight line that approximates a plurality of plots is calculated while the current value is varied, the slope of the approximate straight line is the resistance value of the battery pack 10. It is also possible to calculate the resistance value of each of the cells 11 by a similar method.

If a current resistance value of the battery pack 10 is acquired, it is possible to control charging and discharging operations of the battery pack 10 on the basis of the resistance value. For example, initially, a rate of increase in resistance that is expressed by the ratio (Rc/Rini) of a current resistance value (Rc) to an initial resistance value (Rini) of the battery pack 10 is calculated. When the rate of increase in resistance is higher than a threshold, the controller 50 determines that degradation of the battery pack 10 has excessively advanced, and, as described above, it is possible to limit charging and discharging operations of the battery pack 10. The threshold associated with the rate of increase in resistance may be set in advance in consideration of, for example, the service life of the battery pack 10. Information about the threshold may be stored in the memory 51.

When the battery pack 10 is charged and discharged, current flowing through the battery pack 10 may include ripple current. When current flowing through the battery pack 10 includes ripple current, there occur variations in two current values that are respectively detected by the current sensors 22, 23 or there occur variations in two voltage values that are respectively detected by the monitoring unit 21 and the voltage sensor 25.

Specifically, when current values are respectively detected by the current sensors 22, 23 at predetermined intervals, detected two current values may also differ from each other if the detection timing of the current sensor 22 and the detection timing of the current sensor 23 differ from each other. In addition, when voltage values are respectively detected by the monitoring unit 21 and the voltage sensor 25 at predetermined intervals, detected two voltage values may also differ from each other if the detection timing of the monitoring unit 21 and the detection timing of the voltage sensor 25 differ from each other.

Figure 2:
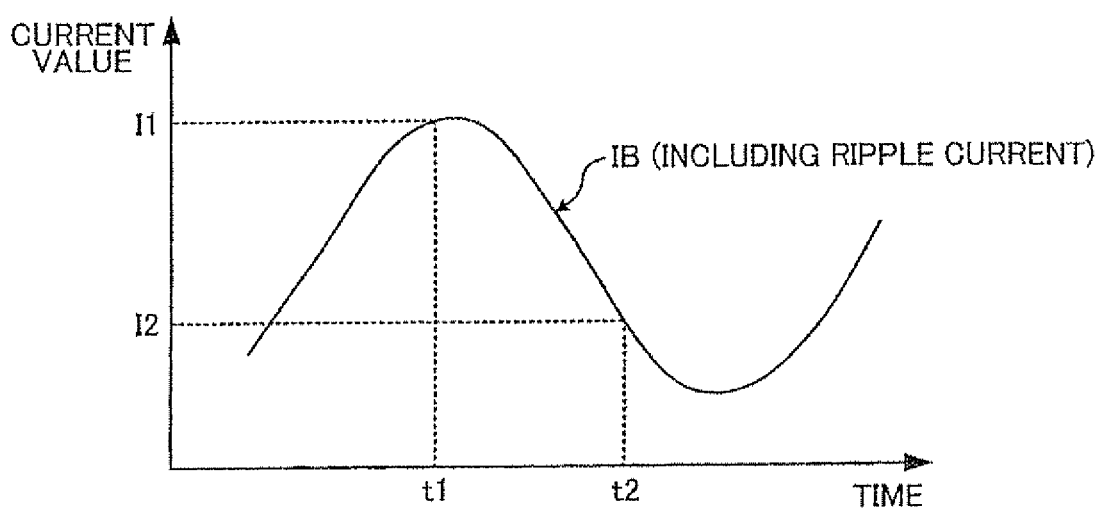
FIG. 2 is a view that illustrates variations in current value to be detected when there is ripple current.

FIG. 2 shows the behavior (one example) of a current value at the time when there is ripple current. As shown in FIG. 2, when a current value IB periodically varies due to ripple current, for example, the current sensor 22 may detect a current value I1 at time t1, and the current sensor 23 may detect a current value I2 at time t2. The interval between time t1 and time t2 is a deviation between the detection timing of the current sensor 22 and the detection timing of the current sensor 23.

As shown in FIG. 2, in accordance with fluctuations in the current value IB, the detected current values I1, I2 differ from each other. In this way, current values that are respectively detected by the current sensors 22, 23 may differ from each other due to a deviation between the detection timings of current values.

On the other hand, when the current value IB fluctuates as shown in FIG. 2, the voltage value of the battery pack 10 also fluctuates with the fluctuations in the current value IB. Therefore, when the timing at which the voltage value is detected by the monitoring unit 21 differs from the timing at which the voltage value is detected by the voltage sensor 25, detected voltage values also differ from each other.

The monitoring unit 21 operates upon reception of a command value for voltage detection. However, if there are variations in the timing at which the monitoring unit 21 receives the command value, the timing at which the monitoring unit 21 detects the voltage value and the timing at which the voltage sensor 25 detects the voltage value may deviate from each other. In addition, the monitoring unit 21 operates on the basis of a clock frequency. However, if there are variations in the clock frequency, the timing at which the monitoring unit 21 detects the voltage value and the timing at which the voltage sensor 25 detects the voltage value may deviate from each other.

Furthermore, the monitoring unit 21 includes an electric element (for example, a photo MOS relay) for converting the high voltage of the battery pack 10 to a low voltage. If there are variations in the operation of the electric element, the timing at which the monitoring unit 21 detects the voltage value and the timing at which the voltage sensor 25 detects the voltage value may deviate from each other.

The voltage sensor 25 detects the voltage value of the capacitor 24. However, unless charging operation of the capacitor 24 is completed, the voltage value of the capacitor 24 is not equal to the voltage value of the battery pack 10. That is, before charging operation of the capacitor 24 is completed, the voltage value of the capacitor 24 is lower than the voltage value of the battery pack 10. Thus, the voltage value detected by the voltage sensor 25 at the time when the capacitor 24 is being charged differs from the voltage value detected by the monitoring unit 21.

As described above, if there are variations in detected current values or detected voltage values due to ripple current, it is difficult to ensure the reliability of current values or voltage values, and, as described above, it is difficult to control charging and discharging operations of the battery pack 10 on the basis of the current values or the voltage values.

Therefore, in the present embodiment, as will be described later, on the condition that it may be determined that there is ripple current, detected current values and detected voltage values are not used in controlling charging and discharging operations of the battery pack 10. Here, the case where current values and voltage values are not used includes the case where current values and voltage values are not detected and the case where current values and voltage values are detected but the detected current values and the detected voltage values are not used in control.

For example, in the case where the resistance value of the battery pack 10 is calculated, on the condition that it may be determined that there is ripple current, it is possible not to use the detected current values and the detected voltage values. Here, not using the detected current values and the detected voltage values is called masking the current values and the voltage values.

Here, when the battery system shown in FIG. 1 is operated, current values may include slight ripple current. Therefore, when there is ripple current due to which variations in current value and variations in voltage value fall within an allowable range, detected current values and detected voltage values are used in controlling charging and discharging operations of the battery pack 10. Only when there is ripple current due to which variations in current value and variations in voltage value fall outside the allowable range, detected current values and detected voltage values are masked.

On the other hand, the controller 50 is able to determine whether there is a failure in one of the monitoring unit 21 and the voltage sensor 25 by comparing the voltage value that is detected by the monitoring unit 21 with the voltage value that is detected by the voltage sensor 25. As described above, the monitoring unit 21 and the voltage sensor 25 each detect the terminal voltage of the battery pack 10, so, when there is no failure in the monitoring unit 21 and the voltage sensor 25, two voltage values that are respectively detected by the monitoring unit 21 and the voltage sensor 25 are equal to each other.

Here, when there is a failure in one of the monitoring unit 21 and the voltage sensor 25, two voltage values that are respectively detected by the monitoring unit 21 and the voltage sensor 25 differ from each other. Therefore, the controller 50 is able to determine whether there is a failure in one of the monitoring unit 21 and the voltage sensor 25 by comparing the two voltage values that are respectively detected by the monitoring unit 21 and the voltage sensor 25 with each other.

In addition, the controller 50 is able to determine whether there is a failure in the current sensors 22, 23 by comparing the two current values that are respectively detected by the current sensors 22, 23 with each other. Both the current sensors 22, 23 are able to detect current flowing through the battery pack 10, so, when there is no failure in the current sensors 22, 23, two current values that are respectively detected by the current sensors 22, 23 are equal to each other.

When there is a failure in one of the current sensors 22, 23, two current values that are respectively detected by the current sensors 22, 23 differ from each other. Therefore, the controller 50 is able to determine whether there is a failure in one of the current sensors 22, 23 by comparing two current values that are respectively detected by the current sensors 22, 23 with each other.

Here, even when there is no failure in the monitoring unit 21 and the voltage sensor 25, two voltage values that are respectively detected by the monitoring unit 21 and the voltage sensor 25 may differ from each other due to a deviation in timing at which the voltage value is detected as described above. In this case, even when there is actually no failure in the monitoring unit 21 and the voltage sensor 25, the controller 50 may determine that there is a failure in one of the monitoring unit 21 and the voltage sensor 25 due to the fact that the two voltage values differ from each other.

Even when there is no failure in the current sensors 22, 23, two current values that are respectively detected by the current sensors 22, 23 may differ from each other due to a deviation in timing at which the current value is detected as described above. In this case, even when there is actually no failure in the current sensors 22, 23, the controller 50 determines that there is a failure in one of the current sensors 22, 23 due to the fact that two current values differ from each other.

In the present embodiment, when there is ripple current, determination as to whether there is a failure in the current sensors 22, 23 is not made by masking the detected values of the current sensors 22, 23 in order to prevent erroneous failure determination. Similarly, when there is ripple current, determination as to whether there is a failure in the monitoring unit 21 and the voltage sensor 25 is not made by masking the detected values of the monitoring unit 21 and the voltage sensor 25.

Figure 3:
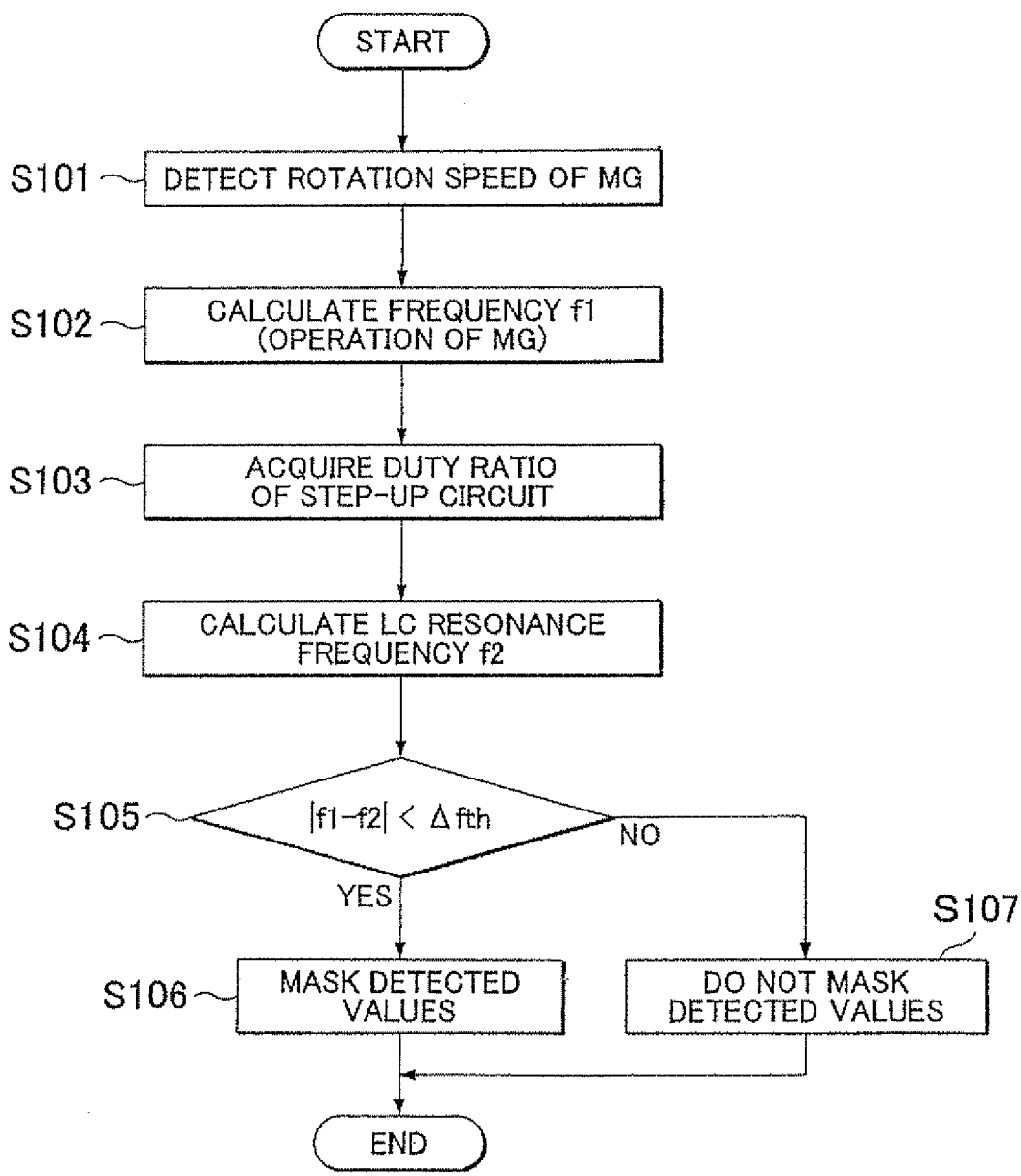
FIG. 3 is a flowchart that illustrates a process of masking detected values in a first embodiment.

Next, the process of masking detected values as described above will be described with reference to the flowchart shown in FIG. 3. The process shown in FIG. 3 is executed by the controller 50. Here, the detected values include at least one of the pair of current values that are respectively detected by the current sensors 22, 23 and the pair of voltage values that are respectively detected by the monitoring unit 21 and the voltage sensor 25.

In step S101, the controller 50 detects the rotation speed of the motor generator 43. For example, with the use of a rotation speed sensor, the controller 50 is able to detect the rotation speed of the motor generator 43.

In step S102, the controller 50 calculates a frequency f1 on the basis of the rotation speed detected in the process of step S101. The frequency f1 is the frequency of current (or voltage), at which current (or voltage) fluctuates due to the operation of the motor generator 43. It is possible to calculate the frequency f1 on the basis of the following mathematical expression (1).

$$f1 = Np/60 \quad (1)$$

In the above mathematical expression (1), N is the rotation speed of the motor generator 43, p is the number of poles of the motor generator 43, that is, the number of magnetic poles that are generated in the motor generator 43. The number of poles p is preset through the configuration of the motor generator 43, so the number of poles p is constant. Therefore, the frequency f1 varies with a variation in the rotation speed N.

In step S103, the controller 50 calculates the duty ratio of the step-up circuit 30. The controller 50 executes drive control over the step-up circuit 30, so it is possible to acquire the duty ratio of the step-up circuit 30. Here, the duty ratio is substantially equal to the ratio (VL/VH) of a stepped-up voltage (VL) to a pre-stepped-up voltage (VH).

In step S104, the controller 50 calculates a frequency f2 on the basis of the duty ratio obtained in the process of step S103. The frequency f2 is an LC resonance frequency in the step-up circuit 30. Specifically, it is possible to calculate the frequency f2 on the basis of the following mathematical expression (2).

$$f2 = Duty/(2\pi\sqrt{LC}) \quad (2)$$

In the above mathematical expression (2), Duty is the duty ratio of the step-up circuit 30, and the value obtained in the process of step S103 is used as Duty. L is an inductance, and C is a capacitance. The inductance value L and the capacitance C are present through the configuration of the battery system (step-up circuit 30), so the inductance L and the capacitance C are constant. Therefore, the frequency f2 varies with a variation in the duty ratio Duty.

In step S105, the controller 50 determines whether the difference (absolute value) between the frequencies f1, f2 is smaller than a threshold dam. Ripple current increases when the frequencies f1, f2 are substantially equal to each other. Therefore, in the process of step S105, it is determined whether the frequencies f1, f2 are substantially equal to each other. Here, when the frequencies f1, f2 coincide with each other, ripple current easily increases, and, even when the frequencies f1, f2 slightly deviate from each other, ripple current still easily increases.

Then, in the present embodiment, the threshold Δfth is set as an upper limit value of the difference (absolute value) between the frequencies f1, f2, which causes ripple current to increase. That is, when the difference (absolute value) between the frequencies f1, f2 is larger than the threshold Δfth, it is determined that a deviation between two detected values (current values or voltage values) is larger than or equal to an allowable value due to ripple current. In addition, when the difference (absolute value) between the frequencies f1, f2 is smaller than the threshold Δfth, it is determined that a deviation between two detected values (current values or voltage values) falls within the allowable range even when there is ripple current.

It is possible to identify the threshold Δfth through an experiment in advance. Information about the threshold Δfth may be stored in the memory 51. Here, the frequency f1 may be higher than the frequency f2, or may be lower than the frequency f2. That is, it is just required to compare a deviation between the frequencies f1, f2 with the threshold Δfth.

In the present embodiment, as described above, the relationship between the two frequencies f1, f2 is taken into consideration; however, it is not limited to this configuration. As described above, the frequency f1 varies on the basis of only the rotation speed of the motor generator 43, and the frequency f2 varies on the basis of only the duty ratio of the step-up circuit 30. Therefore, instead of taking the relationship between the two frequencies f1, f2 into consideration, it is possible to take the relationship between the rotation speed of the motor generator 43 and the duty ratio of the step-up circuit 30 into consideration.

When the difference (absolute value) between the frequencies f1, f2 is smaller than the threshold Δfth, the controller 50 executes the process of step S106. In step S106, the controller 50 masks the detected values. Thus, when charging and discharging operations of the battery pack 10 are controlled, the detected values are not used.

As described above, when the difference (absolute value) between the frequencies f1, f2 is smaller than the threshold Δfth, ripple current easily increases, and variations easily occur in the two detected values. In this case, for example, when the resistance value of the battery pack 10 is calculated (estimated) on the basis of the detected values, it is difficult to ensure the estimation accuracy of the resistance value because the reliability of the detected values is low. Therefore, as described above, by masking the detected values, the detected values are not used in charging and discharging control over the battery pack 10.

On the other hand, when the difference (absolute value) between the frequencies f1, f2 is larger than the threshold Δfth, the controller 50 executes the process of step S107. In step S107, the controller 50 does not mask the detected values. That is, the controller 50 controls charging and discharging operations of the battery pack 10 on the basis of the detected values.

When the difference (absolute value) between the frequencies f1, f2 is larger than the threshold Δfth, ripple current is hard to increase, and there are variations are less likely to occur in the two detected values. For example, when the resistance value of the battery pack 10 is calculated (estimated) on the basis of the detected values, it is possible to ensure the reliability of the detected values, so it is easy to ensure the estimation accuracy of the resistance value. Therefore, as described above, the detected values are not masked, and the detected values are used in charging and discharging control over the battery pack 10.

According to the present embodiment, as long as the difference (absolute value) between the frequencies f1, f2 is smaller than the threshold Δfth, the detected values are masked, and it is possible to suppress a situation that the detected values are masked more than necessary.

Figure 4:
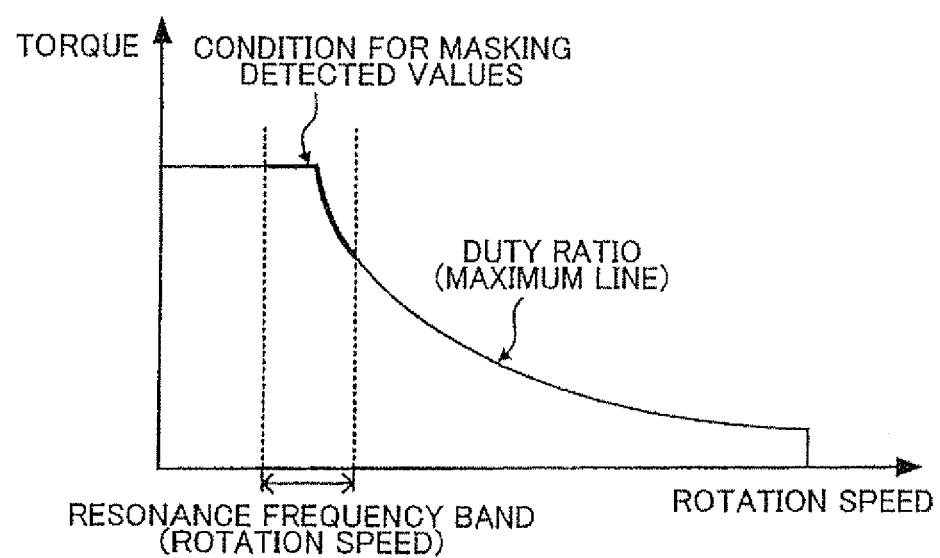
FIG. 4 is a graph that illustrates the correlation between a duty ratio and a rotation speed.

FIG. 4 shows the correlation (one example) between a rotation speed and a torque at a duty ratio at which the voltage is fully stepped up by the step-up circuit 30. In FIG. 4, the abscissa axis represents the rotation speed of the motor generator 43, and the ordinate axis represents the torque of the motor generator 43.

When the duty ratio is specified, the LC resonance frequency at the duty ratio is determined on the basis of the above mathematical expression (2). A resonance frequency band shown in FIG. 4 is a band including the LC resonance frequency that is calculated from the specified duty ratio. That is, the resonance frequency band shown in FIG. 4 is set with reference to the LC resonance frequency, and is set in consideration of the above-described threshold Δfth. When the duty ratio varies, the LC resonance frequency and the resonance frequency band also vary.

Here, when the rotation speed of the motor generator 43 is included in the resonance frequency band shown in FIG. 4, the difference between the frequencies f1, f2 is smaller than the threshold Δfth, so the detected values are masked. That is, in the example shown in FIG. 4, when the duty ratio and the rotation speed are located in a line indicated by the wide line in FIG. 4, the detected values are masked.

According to the present embodiment, only when the difference (absolute value) between the frequencies f1, f2 is smaller than the threshold Δfth, in other words, only when the rotation speed and the duty ratio satisfy a specific condition, the detected values are masked. Thus, it is possible to suppress a situation that the detected values are masked more than necessary in comparison with the case where the detected values are masked on the basis of only the rotation speed of the motor generator 43.

When the detected values are masked on the basis of only the rotation speed of the motor generator 43, it is required to preset a rotation speed range in which ripple current increases. Therefore, depending on the preset rotation speed range, the detected values may be masked although the necessity to mask the detected values is low.

As described above, ripple current easily increases when the rotation speed of the motor generator 43 and the duty ratio of the step-up circuit 30 have the specific correlation, and, when the duty ratio varies, the resonance frequency band shown in FIG. 4 also varies. Therefore, according to the present embodiment, in comparison with the case where the rotation speed range in which ripple current increases is preset, it is possible to appropriately acquire a state where ripple current easily increases.

If the detected values are excessively masked, it is difficult to check the detected values, for example, when charging and discharging operations of the battery pack 10 are controlled. According to the present embodiment, the detected values are masked only within a necessary and sufficient range, so it is easy to check the detected values, for example, when charging and discharging operations of the battery pack 10 are controlled.

A battery system according to a second embodiment of the invention will be described. Here, like reference numerals denote the same members as those described in the first embodiment, and the detailed description is omitted.

In the first embodiment, when the rotation speed of the motor generator 43 and the duty ratio of the step-up circuit 30 have the specific correlation, it is determined that there are variations in detected values (current values or voltage values) due to ripple current or ripple voltage. On the other hand, in the present embodiment, it is determined whether there is ripple current that causes variations in the two detected values on the basis of the current values respectively detected by the current sensors 22, 23 in addition to the process described in the first embodiment (the process shown in FIG. 3).

Figure 5:
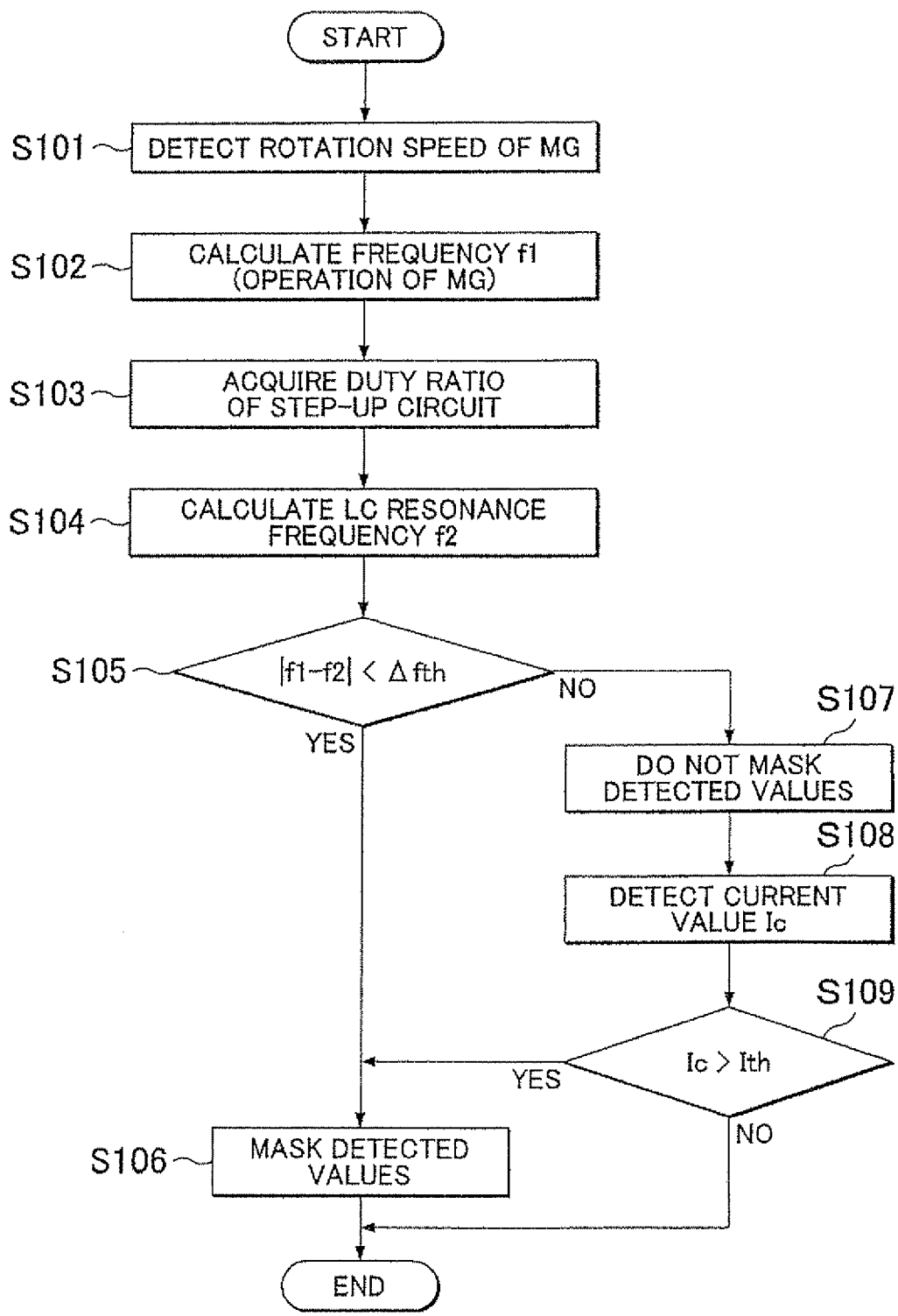
FIG. 5 is a flowchart that illustrates a process of masking detected values in a second embodiment.

The process of the present embodiment will be described with reference to the flowchart shown in FIG. 5. FIG. 5 corresponds to FIG. 3 described in the first embodiment. In FIG. 5, like reference numerals denote the same processes as those described in FIG. 3. Hereinafter, processes different from the processes shown in FIG. 3 will be mainly described.

When the controller 50 does not mask the detected values in the process of step S107, the controller 50 executes the process of step S108. In step S108 the controller 50 detects a current value Ic on the basis of outputs of the current sensors 22, 23.

In step S109, the controller 50 determines whether the current value Ic detected in the process of step S108 is larger than a threshold Ith. The threshold Ith is a current value at or above which variations larger than or equal to an allowable value occur in the two current values that are respectively detected by the current sensors 22, 23 due to ripple current. As the current value Ic increases, ripple current increases, and variations easily occur in the two current values that are respectively detected by the current sensors 22, 23.

Therefore, an upper limit value at or below which variations in the two current values are allowed may be set in advance, and a current value flowing through the battery pack 10 at the time when variations in the current values reach the upper limit value may be set as the threshold Ith. The threshold Ith may be preset through an experiment using the battery system shown in FIG. 1, Information about the threshold Ith may be stored in the memory 51 in advance.

When the current value Ic is larger than the threshold Ith, the controller 50 executes the process of step S106. That is, even when the difference (absolute value) between the frequencies f1, f2 is larger than the threshold Δfth, but when the current value Ic is larger than the threshold Ith, the detected values are masked. Thus, in a state where there are variations in the detected values (current values or voltage values) due to ripple current, it is possible to suppress execution of charging and discharging control over the battery pack 10.

On the other hand, when the current value Ic is smaller than the threshold Ith, the controller 50 ends the process shown in FIG. 5. In this case, variations in detected values due to ripple current are hard to occur, and it is possible to ensure the reliability of the detected values, so it is possible to control charging and discharging operations of the battery pack 10 on the basis of the detected values. In the present embodiment as well, it is possible to obtain advantageous effects similar to those of the first embodiment.

What is claimed is:

1. An electrical storage system comprising:
   an electrical storage device configured to be charged and discharged;
   a step-up circuit configured to step up an output voltage of the electrical storage device;
   an inverter configured to convert a direct-current power, output from the step-up circuit, to an alternating-current power;
   a motor configured to operate upon reception of an output power of the inverter;
   a plurality of sensors each configured to detect at least one of a current value and a voltage value of the electrical storage device; and
   a controller configured to execute a predetermined process on the basis of the detected values of the plurality of sensors, the controller being configured to execute the predetermined process without using the detected values of the sensors when a difference between a frequency of each of the detected values and a resonance frequency of the step-up circuit is smaller than a threshold, the frequency varying with a rotation speed of the motor, and the resonance frequency varying with operation of the step-up circuit.

2. The electrical storage system according to claim 1, wherein
the controller is configured to determine whether the difference is smaller than the threshold on the basis of a relationship between the rotation speed of the motor and a duty ratio at the time of the operation of the step-up circuit.

3. The electrical storage system according to claim 1, wherein
the plurality of sensors include a sensor configured to detect the current value of the electrical storage device and a sensor configured to detect the voltage value of the electrical storage device,
the controller is configured to, as the predetermined process, calculate a resistance value of the electrical storage device on the basis of the current value detected by the plurality of sensors and the voltage value detected by the plurality of sensors, and
the controller is configured to calculate the resistance value without using the current value detected by the plurality of sensors and the voltage value detected by the plurality of sensors when the difference is smaller than the threshold.

4. The electrical storage system according to claim 1, wherein
the plurality of sensors include a first current sensor and a second current sensor each configured to detect the current value of the electrical storage device,
the controller is configured to, as the predetermined process, determine that one of the first current sensor and the second current sensor is in a failed state when the detected value of the first current sensor and the detected value of the second current sensor deviate from each other, and
the controller is configured to make determination as to the failed state without using the detected value of the first current sensor and the detected value of the second current sensor when the difference is smaller than the threshold.

5. The electrical storage system according to claim 1, wherein
the plurality of sensors include a first voltage sensor and a second voltage sensor each configured to detect the voltage value of the electrical storage device,
the controller is configured to, as the predetermined process, determine that one of the first voltage sensor and the second voltage sensor is in a failed state when the detected value of the first voltage sensor and the detected value of the second voltage sensor deviate from each other, and
the controller is configured to make determination as to the failed state without using the detected value of the first voltage sensor and the detected value of the second voltage sensor when the difference is smaller than the threshold.

6. A processing method comprising:
detecting at least one of a current value and a voltage value of an electrical storage device which is charged and discharged, with the use of each of a plurality of sensors; and
executing a predetermined process on the basis of the detected values of the plurality of sensors, the predetermined process being executed without using the detected values of the sensors in the predetermined process when a difference between a frequency of each of the detected values and a resonance frequency of a step-up circuit is smaller than a threshold, the frequency varying with a rotation speed of a motor that operates upon reception of an output power of the electrical storage device, and the resonance frequency varying with operation of the step-up circuit that steps up an output voltage of the electrical storage device and outputs the stepped-up electric power to the motor.

* * * * *